Figure 1:
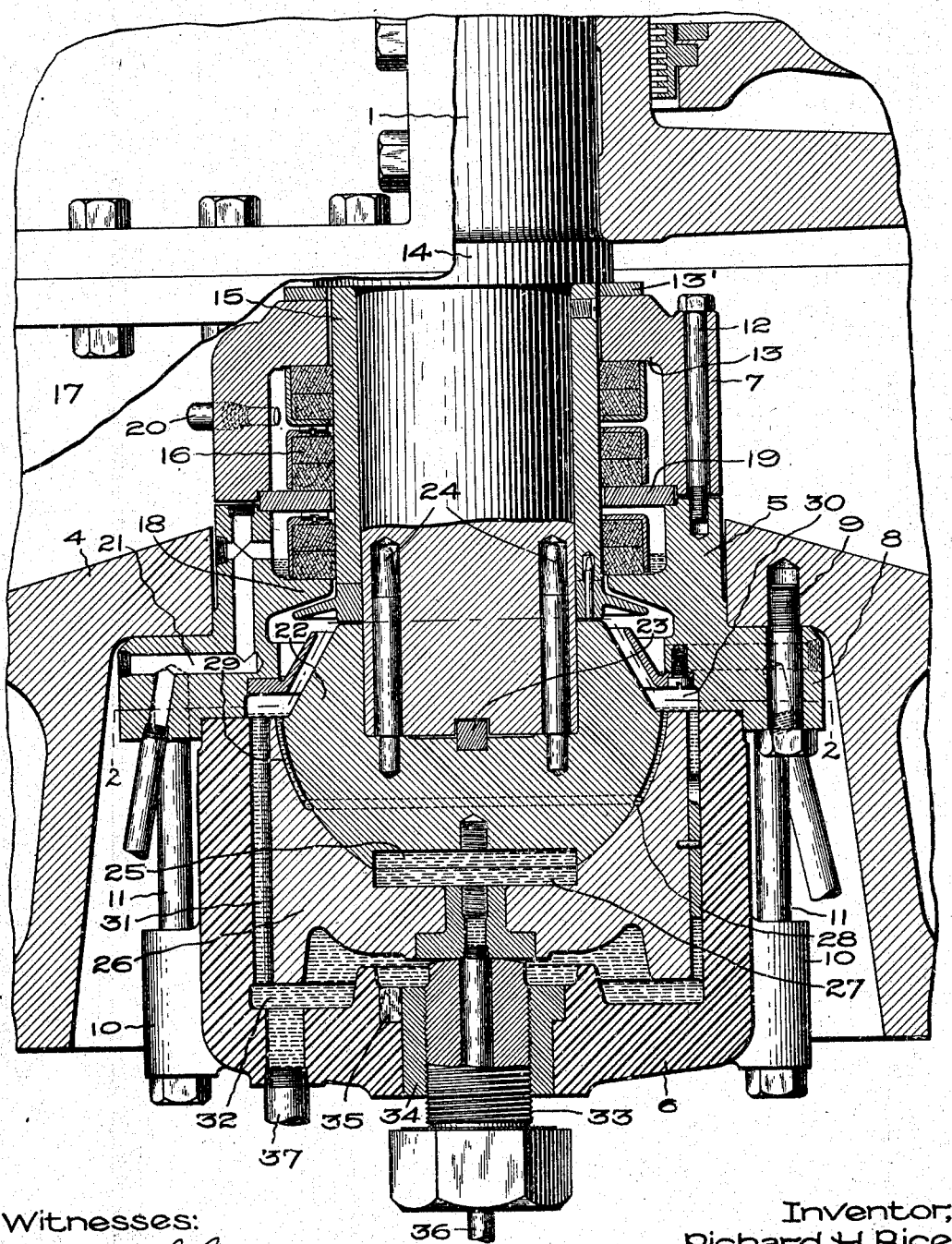

R. H. RICE.
STEP BEARING FOR UPRIGHT SHAFTS.
APPLICATION FILED JULY 22, 1907.

953,231.

Patented Mar. 29, 1910.

2 SHEETS—SHEET 1.

Witnesses:
Marcus L. Byng.
J. Ellis Glen

Inventor:
Richard H. Rice,
By Albert G. Davis
Att'y.

R. H. RICE.
STEP BEARING FOR UPRIGHT SHAFTS.
APPLICATION FILED JULY 22, 1907.
953,231.
Patented Mar. 29, 1910.
2 SHEETS—SHEET 2.
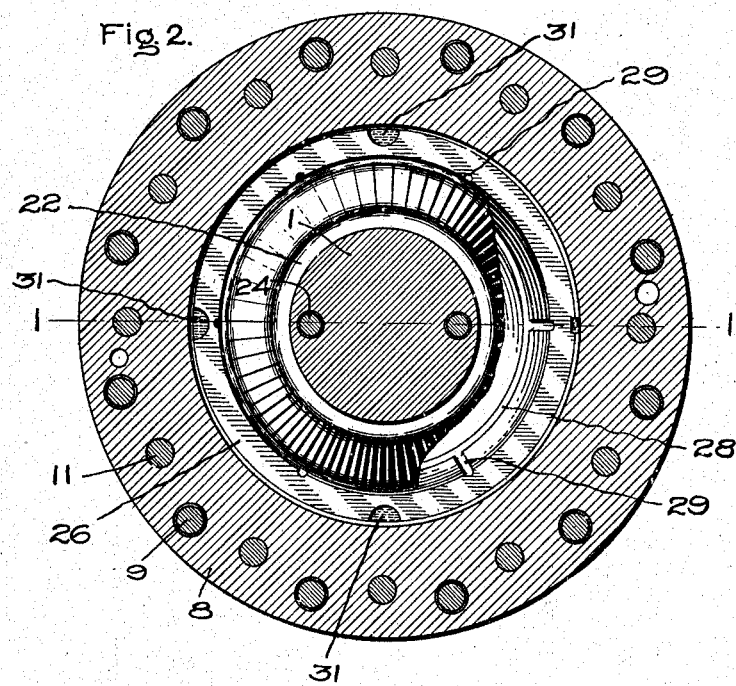
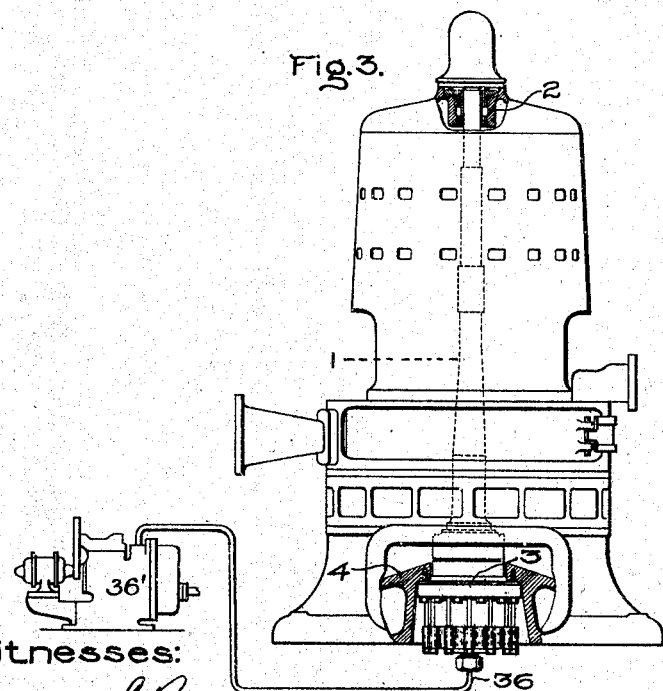
Witnesses:
Marcus L. Byng.
J. Ellis Glen.
Inventor,
Richard H. Rice,
By
Att'y.

UNITED STATES PATENT OFFICE.

RICHARD H. RICE, OF SWAMPSCOTT, MASSACHUSETTS, ASSIGNOR TO GENERAL ELECTRIC COMPANY, A CORPORATION OF NEW YORK.

STEP-BEARING FOR UPRIGHT SHAFTS.

953,231.  Specification of Letters Patent.  Patented Mar. 29, 1910.

Application filed July 22, 1907. Serial No. 385,057.

*To all whom it may concern:*

Be it known that I, RICHARD H. RICE, a citizen of the United States, residing at Swampscott, county of Essex, State of Massachusetts, have invented certain new and useful Improvements in Step-Bearings for Upright Shafts, of which the following is a specification.

This invention relates to shaft bearings and its object is to improve the construction and operation of the step bearing which supports and guides the lower end or foot of an upright shaft.

The invention is especially designed for use in elastic fluid turbines, but is not necessarily limited thereto.

The bearing is essentially a spherical one, as distinguished from those having flat bearing surfaces. This permits it to accommodate itself more readily to minute changes in the alinement of the shaft, which cause vibration and wear at high speeds, if not provided for. It also tends to center and guide the shaft and maintain it constantly in a central position, which still further tends to eliminate vibration and side thrust.

In the accompanying drawings, the invention is shown applied to a turbo-generator, Figure 1 being a vertical section of the bearing and adjacent parts; Fig. 2 a cross section on the line 2—2, Fig. 1; and Fig. 3 a side elevation of a turbo-generator equipped with said invention.

Referring to the last figure, the upright shaft 1 is shown as supported at the top by the guide bearing 2, and at the bottom by the step bearing which is inclosed in a shell 3 suitably attached to the base 4. In Fig. 1 it appears that the shell 3 comprises three parts, to wit, a body 5, a cup-shaped supporting plate 6, and an upper section 7. The body 5 fits in an opening in the base 4, and has a flange 8 through which screws 9 are inserted into the base to fasten said body in place. The supporting plate 6 has external lugs 10 to receive long fastening bolts 11 which are tapped into the flange 8. The upper section 7 rests on the upper end of the body 5, to which it is fastened by screws 12. The upper end of the section 7 has an internal flange 13, on which a shoulder 14 of the shaft rests. A washer 13' is preferably inserted between them. Below said shoulder the shaft is provided with a bushing 15 carrying packing-rings 16, preferably of carbon, to make a steam-tight joint between the interior of the wheel casing 17 and the atmosphere. The upper packing-ring bears against the under side of the flange 13; the lower ring bears upon an internal flange 18 on the body 5; while an intermediate ring may bear upon an annulus 19 whose outer edge is clamped between the body and the upper section 7. At 20 is an inlet for a supply of lubricant, the overflow escaping through a duct 21 in the body 5. The lower end of the shaft is let into a socket in a revolving step plate or shoe 22, preferably of cast iron, and secured to the shaft by a transverse key 23 and longitudinal guide pins 24. This shoe constitutes the revolving portion of the step bearing. It is preferably substantially hemispherical, its lower or polar portion containing a recess 25 to serve as a pocket for lubricant.

The fixed portion of the bearing, that is to say the step proper, is a cylinder 26 having a close sliding fit in the cylindrical cup-shaped supporting plate 6. It contains a hemispherical seat for the shoe 22, the central portion of said seat being recessed to form a pocket 27 registering normally with the pocket 25. About half way between the pocket and the top of the seat there is a substantially horizontal circumferential groove 28 which communicates by a number of upright grooves 29 with the space 30 above the step, from which ducts 31 extend through the step to a chamber 32 in the lower part of the cup-shaped supporting plate. The step is supported on a stout adjusting screw 33 tapped through a bushing 34 which is countersunk in the bottom of the plate 6 and is prevented from rotating by a key 35. The screw is tubular to admit a pipe 36 which communicates with the pockets 25, 27. The pipe 36 leads from a pump 36' of any approved construction. Lubricant, such as water, from any suitable source is pumped into said pockets under a pressure sufficient to cause a thin film to flow from the pockets between the spherical surfaces of the shoe and step and overflow through the grooves 28, 29 and the ducts 31 into the chamber 32, from which it escapes by the pipe 37.

This step bearing is readily accessible for inspection and repair. It has large bearing surfaces which will not be seriously injured in case the flow of the step water ceases or the bearing runs dry. Should there be any slight change in the various parts of the structure, due to unequal expansion or other causes, this bearing readily accommodates itself to the altered conditions.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with the foot of an upright shaft, of a shoe thereon having a bearing surface which is a portion of a spherical surface, a step for said shoe containing a seat having a bearing surface which is also a portion of a spherical surface, there being registering pockets in the lower part of said shoe and the adjacent part of the seat, upright grooves in the upper part of said seat, and a smooth or ungrooved surface extending from said pockets to the beginning of the grooves, and means for supplying lubricant under pressure to the pockets to flow therefrom over said surface to the grooves.

2. In a step bearing, the combination with the foot of an upright shaft, of a shoe having a socket which receives said foot, a substantially hemispherical bearing surface and a pocket for lubricant in the lower portion of said surface, a casing having a bottom plate, a step mounted in said plate which has a hemispherical seat for the shoe, said seat having a pocket for lubricant coöperating with the pocket in the shoe, a horizontal groove in the surface of the bearing intermediate the pockets and the top of the bearing and other grooves in said surface leading upward from said horizontal groove to the top of the surface, and a conduit conveying lubricant from a suitable source to the pockets to flow therefrom to the grooves and the bearing surface.

3. The combination with the foot of an upright shaft, of a shoe having a bearing surface which is a portion of a spherical surface and a socket to receive said foot, devices uniting said shoe and shaft to cause them to rotate together, a cylindrical step having a seat for said shoe which seat is also a portion of a spherical surface, there being registering pockets in said shoe and seat, a cup-shaped supporting plate for the step having a chamber in its lower portion between the end of the step and the bottom of the plate, an adjusting screw mounted in the plate on which said step is supported, a pipe for lubricant passing longitudinally through said screw and communicating with said pockets to supply lubricant to the bearing surfaces, and conduits for conveying the lubricant exhausted from the upper portion of the bearing to said chamber.

4. The combination with the foot of an upright shaft, of a shoe having a substantially hemispherical surface and a lubricant-pocket in its polar portion, a casing having a cup-shaped bottom plate, a cylindrical step fitted in said plate and having a hemispherical seat for said shoe, said seat containing a lubricant-pocket registering with the one in said shoe, a circumferential groove about midway between said pocket and the top of said step, and upright grooves extending therefrom to the top of the step, ducts in said step leading to a chamber in the lower part of the bottom plate, and means for forcing lubricant under pressure into said pockets.

5. The combination with the lower end of an upright shaft, of a single bearing for supporting said end and for guiding it against lateral movement comprising a shoe on the end of the shaft having a bearing surface which is a portion of a spherical surface, a centrally located key in the end of the shaft and the adjoining portion of the shoe, guide pins in the shoe and shaft on opposite sides of the key, a seat having a bearing surface which is also a portion of a spherical surface and coöperates with the bearing surface of the shoe, a cup-shaped supporting plate for the seat having a chamber in its lower portion, a screw mounted in the plate for adjusting said seat, means forcing lubricant into the lower portion of the bearing surface to maintain a flowing film of lubricant between the shoe and its seat, a conduit for conveying the lubricant exhausted from the top of the bearing surface to the chamber in said supporting plate, and a conduit for conveying lubricant from said chamber.

6. The combination with the foot of an upright shaft, of a shoe having a bearing surface which is a portion of a spherical surface, means uniting said shoe and shaft to cause them to rotate together, a cylindrical step block having a seat for said shoe which seat is also a portion of a spherical surface, there being axially arranged registering pockets in said shoe and seat, a cup-shaped supporting plate in which the step is mounted, said plate having a chamber in its lower portion, means for supplying lubricant under pressure to said pockets to flow therefrom to the bearing surfaces, and a conduit for conveying lubricant exhausted from the upper portion of the bearing to the chamber in said plate.

In witness whereof, I have hereunto set my hand this eighteenth day of July, 1907.

RICHARD H. RICE.

Witnesses:
E. P. RICKER,
ALICE W. RICE.